US010515047B1

(12) United States Patent
Maidee

(10) Patent No.: US 10,515,047 B1
(45) Date of Patent: Dec. 24, 2019

(54) PIPELINED DATA CHANNEL WITH READY/VALID HANDSHAKING

(71) Applicant: Xilinx, Inc., San Jose, CA (US)

(72) Inventor: Pongstorn Maidee, San Jose, CA (US)

(73) Assignee: XILNX, INC., San Jose, CA (US)

( * ) Notice: Subject to any disclaimer, the term of this patent is extended or adjusted under 35 U.S.C. 154(b) by 34 days.

(21) Appl. No.: 15/982,891

(22) Filed: May 17, 2018

(51) Int. Cl.
  *G06F 13/00* (2006.01)
  *G06F 13/14* (2006.01)
  *G06F 13/20* (2006.01)
  *G06F 13/36* (2006.01)
  *G06F 13/38* (2006.01)
  *G06F 13/40* (2006.01)
  *G06F 13/42* (2006.01)

(52) U.S. Cl.
  CPC ...... *G06F 13/4269* (2013.01); *G06F 13/4027* (2013.01)

(58) Field of Classification Search
  CPC .......... G06F 13/20; G06F 13/36; G06F 13/00; G06F 13/14; G06F 13/38; G06F 13/40
  See application file for complete search history.

(56) References Cited

U.S. PATENT DOCUMENTS

| 2009/0300382 A1* | 12/2009 | Bruce ...................... G06F 1/32 |
| | | 713/310 |
| 2011/0093636 A1* | 4/2011 | Matterne ............... G06F 13/124 |
| | | 710/112 |
| 2012/0215955 A1* | 8/2012 | Yun ..................... G06F 13/1657 |
| | | 710/110 |
| 2019/0188173 A1* | 6/2019 | Otani ..................... G06F 12/00 |

OTHER PUBLICATIONS

Xilinx, "AXI Interconnect v2.1, LogicCORE IP Product Guide," p. 059, Dec. 20, 2017, pp. 1-171, Xilinx, Inc., San Jose, California, USA.

* cited by examiner

*Primary Examiner* — David E Martinez
(74) *Attorney, Agent, or Firm* — W. Eric Webostad

(57) ABSTRACT

Apparatus and method relate to a data channel. In this apparatus, an input circuit is configured to gate a valid input with a ready output to provide a forward token ("f-token") to a first f-token register of a f-token pipeline and to a counter, and to receive data to a first data register of a data pipeline. An output circuit is configured to gate a ready input with a valid output to provide a return token ("r-token") to a first r-token register of a r-token pipeline and to a FWFT FIFO, to receive the f-token from a second f-token register of the f-token pipeline to the FWFT FIFO, and to receive the data from a second data register of the data pipeline to the FWFT FIFO. The input circuit receives the r-token from the first r-token register to a second r-token register of the r-token pipeline for the counter.

20 Claims, 5 Drawing Sheets

PIPELINED DATA CHANNEL WITH READY/VALID HANDSHAKING

TECHNICAL FIELD

The following description relates to integrated circuit devices ("ICs"). More particularly, the following description relates to a pipelined data channel with ready/valid handshaking for an IC.

BACKGROUND

Wide data channels can make timing closure problematic, as such wide data channels may span long distances across an IC and/or between multiple ICs ("Super Logic Regions" or "SLRs") mounted on an interposer. With reference to programmable logic devices, such as for example FPGAs, timing may be improved by adding stages of register slices to a circuit design. However, addition of such stages of register slices incurs a significant overhead penalty in terms of circuit resources and semiconductor area.

SUMMARY

An apparatus relates generally to a data channel. In such an apparatus, there is an input circuit and an output circuit. The input circuit has a first gate, a first forward token register, an up/down counter, and a first data register. The first gate is configured to gate a valid input signal with a ready output signal to provide a forward token. The first forward token register is configured to receive the forward token. The up/down counter is configured to receive the forward token. The first data register is configured to receive data. The output circuit has a second gate, a first return token register, a first word fall through first-in first-out buffer circuit ("FWFT FIFO"), a second forward token register, and a second data register. The second gate is configured to gate a ready input signal with a valid output signal to provide a return token. The first return token register is configured to receive the return token. The FWFT FIFO is configured to receive the return token. The second forward token register is configured to provide the forward token to the FWFT FIFO. The second data register is configured to provide the data to the FWFT FIFO. The FWFT FIFO is configured to output the data. The input circuit further has a second return token register. The second return token register is configured to receive the return token from the first return token register for the up/down counter.

A method relates generally to a data channel. In such a method, there is controlled pipelining of information between an input circuit and an output circuit. This controlled pipelining includes: gating by the input circuit a valid input signal with a ready output signal to provide a forward token to a first forward token register of a forward token pipeline and to the up/down counter; receiving a data by a first data register of a data pipeline; passing the data from the first data register to a second data register in the data pipeline for a data flow direction; passing the forward token from the first forward token register to a second forward token register in the forward token pipeline for the data flow direction; receiving the forward token from the second forward token register and the data from the second data register by a first word fall through first-in first-out buffer circuit ("FWFT FIFO") of the output circuit; gating by the output circuit a ready input signal with a valid output signal to provide a return token to a first return token register of a return token pipeline; outputting the data from the FWFT FIFO; and passing the return token from the first return token register to a second return token register of the return token pipeline.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Conventional data channels may be used to communicate from one IC chip to another IC chip across an interposer. As system frequency increases and data channels become wider, timing closure becomes more problematic, if not impossible, for some high-frequency applications. In feed-forward data channels, registers may be added to improve frequency; however, for data channels with valid/ready handshaking signals, conventionally additional logic has been added with such registers to maintain proper handshake signaling.

In contrast to conventional data channels using valid/ready handshaking, a pipelined data channel with valid/ready handshaking is described without such additional logic added to interim pipeline register stages. Rather, an input circuit and an output circuit are used to bracket any such interim pipeline register stages. Such input and output circuits are configured to remove having a valid signal and a ready signal, as well as associated interim logic, present in interim pipeline stages. While such a data channel may be used with just input and output circuits as described herein, overall circuitry savings increases with use of interim pipeline circuit stages in comparison to using FPGA register slices. This reduction in circuitry and other features are described below in additional detail.

With the above general understanding borne in mind, various configurations for a pipelined data channel with ready/valid handshaking are generally described below.

Figure 1:
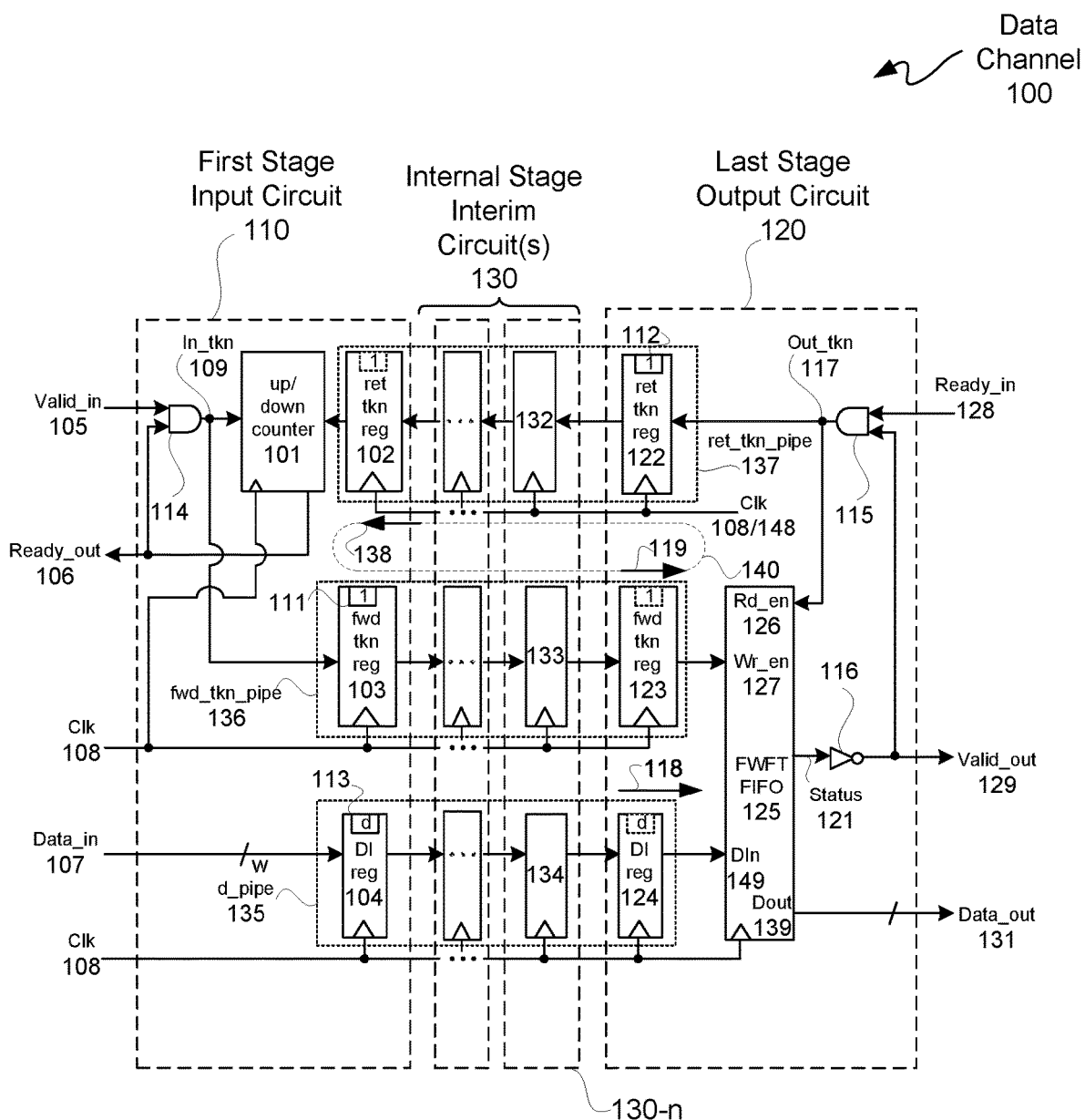
FIG. 1 is a block-circuit diagram depicting an exemplary data channel.

FIG. 1 is a block-circuit diagram depicting an exemplary data channel 100. Data channel 100 may be one of many data channels 100 in an integrated circuit, such as an FPGA, ASIC or other integrated circuit. Moreover, data channel 100 may be one of many data channels going from one IC die to another IC die via an interposer.

Data channel 100 includes a first stage input circuit ("input circuit") 110 and a last stage output circuit ("output circuit") 120 coupled to one another for pipelined operation of data channel 100. One or more internal stage interim circuits ("interim circuits") 130 of data channel 100 may respectively be coupled between input circuit 110 and output circuit 120 for such pipelined operation. Data channel 100 may exist with just an input circuit 110 coupled to an output circuit 120 without any additional pipeline stages provided by one or more interim circuits 130. However, savings in circuit resources may increase with use of more interim circuits 130 as compared to a conventional pipelined data channel having a same number of register stages.

There may be a positive integer number, n, of interim circuits 130. In an example, input circuit 110 and output circuit 120, as well as any and all interim circuits 130-n, may be coupled for pipelined operation of an Advanced eXtensible Interface ("AXI") channel. Though the example of an AXI channel in an FPGA is used for purposes of clarity by way of non-limiting example, data channel 100 may be for an AXI interface or another type of integrated circuit interface using ready/valid handshaking.

A data channel with ready/valid handshaking includes three types of signals on both an input side and an output side, namely a data signal, a valid signal, and a ready signal. A valid signal flows in the same direction as a corresponding data signal, and a valid signal may be used to indicate validity of data on such data signal of a same clock cycle as such valid signal. A ready signal, which flows in an opposite direction as such a data signal for a same input or output side, indicates data is ready to be or was captured. In other words, data for a cycle, i, moves if and only if both valid and ready signals are asserted at such cycle, i.

An input circuit 110 may have an up/down counter 101, an output or return token register 102, a data input register 104, and an input or forward token register 103. Input circuit 110 may be configured to gate a valid input signal 105 with a ready output signal 106 to provide an input or forward token 111 via an input or forward token signal 109 to input or forward token register 103 and to up/down counter 101. Forward token register 103 may be configured to receive and register each such forward token 111 asserted.

In this example, input circuit 110 includes an AND gate 114 coupled to receive valid input signal 105 and ready output signal 106 to provide forward token signal 109. In this example, valid input signal 105 is gated with a ready output signal 106 by an AND gate 114. However, in another example, another type of logic circuit may be used for gating valid input signal 105 with a ready output signal 106.

Data input register 104 may be configured to receive and register data ("input data") 113 via a data input signal 107. Data input signal 107 may have a data width, w, as generally indicated. However, for purposes of clarity and not limitation, only single lines are generally depicted even though such single lines may be for single or multiple signal traces or busses. For this example, while data lines may be multiple bits wide, tokens may be represented with a single bit, such as representing a binary logic 1 for example.

Data input signal 107 may be associated with valid input signal 105, and thus data input signal 107 may be associated with forward token signal 109. For example, a valid input signal 105 may be asserted to propagate along with input data provided with data input signal 107 from an upstream circuit or device (not shown) for input of both to data channel 100 in a same clock cycle, such as of clock signal 108 for example. As valid input signal 105 is associated with input data provided via data input signal 107, a forward token 111 of forward token signal 109, which is generated in part responsive to state of valid input signal 105, registered in forward token register 103 in a clock cycle of clock signal 108 may similarly be associated with input data signal 113 of data input signal 107 registered in data input register 104 on a same clock cycle.

Up/down counter 101 may be configured to adjust a count thereof either up or down responsive to each forward token 111 of forward token signal 109. Up/down counter 101 may be configured, such as set, with a threshold value, and may be clocked with clock signal 108. In this example, AND gate 114 receives a valid input signal 105, which is active high. Assuming a current count in up/down counter 101 is not greater than a threshold value, ready output signal 106 is non-zero, namely a logic 1. Further assuming valid input signal 105 is asserted to accompany input data 113 to data channel 100, then both inputs to AND gate 114 may be logic 1s, resulting in a logic 1 output from AND gate 114, namely a forward token 111 for forward token signal 109.

In this example, forward token signal 109 is provided to a decrement count port of up/down counter 101 to decrement a count thereof. In another example, forward token signal 109 may be provided to an increment count port of up/down counter 101 to count up to a threshold value.

A threshold value in this example for up/down counter 101 is a count of zero. When up/down counter 101 is decremented down to a count of zero, ready output signal 106 is deasserted, namely logic 0 in this example. For a deasserted ready output signal 106, forward token signal 109 output from AND gate 114 is likewise logic 0, which means that AND gate 114 stops issuing any forward tokens 111 for forward token signal 109. Furthermore, ready output signal 106 may be provided to a circuit upstream (not shown) with respect to data channel 100 to inform such upstream circuit whether or not data channel 100 has captured input data 113 via data input signal 107. A ready output signal 106 may be used to indicate data has been captured. In this example, when a ready output signal 106 is a logic 0, it means the data in data input signal 107 presented with a valid '1' of valid input signal 105 is not yet captured in data channel 100. As a result, an upstream circuit should hold valid '1 for valid input signal 105 and hold the current data. In this example, when a ready output signal 106 is a logic 1, it means the data in data input signal 107 presented with a valid '1' of valid input signal 105 is captured in data channel 100.

Initially, up/down counter 101 may be set to a maximum value and may then proceed to count down from such set maximum value for each forward token 111 received via forward token signal 109. For example, up/down counter 101 may be set or initialized to 33 or some other positive integer to count down from. As long as a count of up/down counter 101 does not equal a threshold value of zero, namely is greater than a threshold value, ready output signal 106 may continue to be asserted, namely generally held at a logic 1 level in this example. Once a count in up/down counter is zero, then ready output signal 106 may be transitioned to be deasserted, namely generally held at a logic 0 level in this example.

An output circuit 120 may have a first word fall through first-in, first-out buffer circuit ("FWFT FIFO") 125, an output or return token register 122, a data input register 124, and an input or forward token register 123. Even though a regular FIFO may be used, use of an FWFT FIFO may reduce latency over a regular FIFO. A regular FIFO may be used with additional logic to make the timing of empty and data comply with a ready/valid handshake protocol, namely to make regular FIFO with such additional logic operate same or similar to a FWFT FIFO, and so an FWFT FIFO is described for purposes of clarity and not limitation. In this example, FWFT FIFO 125 has 33 entries or slots; however, in another example, FWFT FIFO 125 may have a different depth. However, for this example, up/down counter 101 is initialized or reset to a number of entries in FWFT FIFO 125, namely 33 in this example. It should be appreciated that an FWFT FIFO implemented with clock controlled flip-flops may move data from flip-flop to flip-flop through a stack; however, an FWFT FIFO implemented with random access memory for example may move data by moving pointers, namely changing a read address for example. In this example, FWFT FIFO is implemented using random access memory, as described below in additional detail.

Data input register 104 and data input register 124 may be configured in a data pipeline 135 for a data flow direction 118 from data input register 104 to data input register 124. Forward token register 103 and forward token register 123 may be configured in a forward token pipeline 136 for a forward direction 119 from forward token register 103 to forward token register 123 corresponding to data flow direction 118. Data flow direction 118 and forward direction 119 may be used interchangeably herein as they are the same direction. Input data 113 and an accompanying forward token 111 may traverse one register stage of pipelines 135 and 136, respectively, per clock cycle of clock signal 108 until reaching FWFT FIFO 125.

Each of pipelines 135 and 136 may be clocked responsive to clock signal 108. A forward token 111 registered in forward token register 103 may correspond with input data 113 registered in data input register 104. A forward token 111 and input data 113 pair may be clocked register stage-by-register stage through pipelines 136 and 135, respectively, from forward token register 103 to forward token register 123 for a token and from data input register 104 to data input register 124 for corresponding data.

FWFT FIFO 125 may be configured to receive a forward token 111 from forward token register 123 and input data 113 from data input register 124. FWFT FIFO 125 may be configured to receive forward token 111 from forward token register 123 to a write activation or enable port 127 of FWFT FIFO 125 and to receive corresponding input data 113 from data input register 124 to a data input port 149 of FWFT FIFO 125. FWFT FIFO 125 may be configured to provide an output data signal 131 in association with valid output signal 129.

Output data signal 131 may provide input data 113 to data channel 100 to a downstream circuit (not shown). Provided with such input data 113 via output data signal 131 may be valid output signal 129 to indicate such input data 113 output is a valid data output.

Output circuit 120 may be configured to gate a ready input signal 128, such as provided from a downstream circuit (not shown) with a valid output signal 129 to provide an output or return token signal 117 to return token register 122 and to FWFT FIFO 125. Output circuit 120 may be configured to provide an output or return token 112 of return token signal 117 to a read activation or enable port 126 of FWFT FIFO 125.

In this example, output circuit 120 includes an AND gate 115 coupled to receive valid output signal 129 and ready input signal 128 to provide return token signal 117, and output circuit 120 includes an inverter 116 coupled to receive a status signal 121 from FWFT FIFO 125 to provide valid output signal 129, namely as an inversion of status signal 121.

Conventionally, in an FPGA, as well as other integrated circuits, depth or number of slots, and width per slot, may be programmably configurable using memory, such as for example lookup table random access memory ("LUTRAM"). Furthermore, data input and data output busses of a FIFO may be same or different widths, as may be programmably configurable.

In this example, in order to write input data 113 into a FWFT FIFO 125, such data is pushed onto a data input bus 149 and then a write activation signal 127 is strobed, such as with a forward token 111 being logic high, during a clock cycle of clock signal 108. This writes input data 113 on an input data bus 149 into a memory slot or entry in an FWFT FIFO 125.

For FWFT FIFO 125 not in an empty state, status signal 121 is not asserted, which means valid output signal 129 is asserted. Along those lines, data in FWFT FIFO 125 is loaded for output on data output bus or port 139. A downstream circuit (not shown) asserts ready input signal 128, indicating such downstream circuit is ready to accept output data from data channel 100. For both ready input signal 128 and valid output signal 129 being asserted, return token signal 117 of AND gate 115 is asserted. AND gate 115 may be used in case a downstream circuit (not shown) asserts ready input signal 128 without first checking that valid output signal 129 is asserted. For this example, for a downstream circuit (not shown) indicating a readiness to receive data by holding ready input signal 128 logic high, return token signal 117, sourced from output of AND gate 115 responsive to both of input signals 128 and 129 being a logic high or 1, is a logic high or 1. Return token signal 117 provides such a logic high as a return token and a read strobe. A downstream circuit may assert ready input signal 128 while checking valid output signal 129 to reduce latency. In such a situation, AND gate 115 may be used to prevent premature sending of a return token 112.

Return token signal 117 asserted provides a return token 112 to return token register 122 and strobes a read activation port 126 of FWFT FIFO 125. For example, FWFT FIFO 125 may move next available output data onto data output bus 139 responsive to assertion of a strobe of read activation port 126. Return token 112 may be used to indicate an entry in FWFT FIFO 125 has become available.

For an FWFT FIFO 125, for one or more bytes written into an empty FWFT FIFO 125, such one or more bytes of a "first" write may immediately appear on an output bus or port 139 of FWFT FIFO 125. Such one or more bytes of a "first" write to a previously empty FWFT FIFO 125 may be read out from such buffer on a next clock cycle without having to strobe a read activation port 126 of such buffer. In another example, more than one clock cycle may be used to read out from FWFT FIFO 125 without having to strobe a read activation port 126 of such buffer. Along those lines, a write clock, namely a transmit clock from an upstream data sender, and a read clock, namely a receive clock from a downstream data receiver, provided to a FWFT FIFO, as described below in additional detail, may use more than one clock cycle. Furthermore, for a FWFT FIFO 125, a byte or bytes from a slot or entry may be read at the same time a write activation signal is strobed high to allow the next byte or bytes to be output to be made available for reading out on the next clock cycle.

For an empty FWFT FIFO 125, input data 113 may be piped through to FWFT FIFO 125 while return token signal 117, used to strobe a read activation port 126 of FWFT FIFO 125, is inactive low. In other words, "first-pushed" data shows up on an output data bus as soon as it "falls through" such FIFO. This allows in-flight input data 113 to be captured in and buffered out of FWFT FIFO 125 without having to strobe read activation port 126.

A deasserted "not empty" flag for status signal 121 output from FWFT FIFO 125 means that data on data output bus 139 is present or valid. Accordingly, data output signal 131 may have output data, and such output data may be provided, with valid output signal 129 asserted.

Status signal 121 may be asserted, namely at a logic high or 1 level in this example, when FWFT FIFO 125 is empty. For an asserted status signal 121, valid output signal 129 is logic low. This means that return token signal 117 output from AND gate 115 is logic low, as no return token is issued by return token signal 117 and no strobe of read activation port 126 is performed by return token signal 117, as described below in additional detail. While data channel 100 construction guarantees FWFT FIFO 125 does not get over filled, namely an over flow condition is not encountered, FWFT FIFO 125 may be full. However, as a full signal is used to prevent overwriting existing data inside a FIFO, a full signal is not used in this example of data channel 100. Status signal 121 may accordingly be deasserted, namely at a logic low or 0 level in this example, when FWFT FIFO 125 is full.

For return token signal 117 logic high, a return token, such as return token 112 for example, may be provided as a read strobe to read activation port 126 of FWFT FIFO 125 and a data input of return token register 122. Return token register 122 and return token register 102 may be configured as a return token pipeline 137 for a return direction 138 from return token register 122 to return token register 102 opposite of data flow direction 118. Return token pipeline 137 may be clocked responsive to clock signal 108 to pipeline return token 112, one register stage for each clock cycle, for input to up/down counter 101.

Return token pipeline 137 can be shorter than pipelines 135 and 136. Along those lines, one or more interim return token registers 132 may be removed from return token pipeline 137. Furthermore, return token pipeline 137 may be clocked by clock signal 108 or another clock signal, where such other clock signal has a different frequency than clock signal 108. For example, for use of another clock signal, a clock domain crossing circuit may be added, as generally indicated by clock signal 148, on an input side and an output side of return token pipeline 137. As indicated below in additional detail, such a circuit may be a dual clock FIFO, where one such a dual clock FIFO is positioned between up/down counter 101 and return token register 102, and where another dual clock FIFO is positioned between AND gate 115 and return token pipeline 137. A clock signal 148, at a higher frequency than clock signal 108, may be used to clock all registers of return token pipeline 137 at such higher frequency. However, it may be more pragmatic to used two clocks with fewer pipeline stages so only one clock domain crossing circuit is used, as described below in additional detail. Either or both a shorter pipeline or a higher frequency allows return tokens 112 to be replenished more readily in order to have data channel 100 ready to accept more input data.

As previously described, forward token pipeline 136 and data pipeline 135 may be configured to respectively clock cycle-for-clock cycle pass a forward token 111 and input data 113 associated therewith in data flow direction 118 to FWFT FIFO 125 responsive to a clock signal 108. Similarly, return token pipeline 137 may be configured to clock cycle-for-clock cycle pass a return token 112 of return token signal 117 in return direction 138 responsive to clock signal 108 from return token register 122 to return token register 102. Each such return token 112 may be output from return token register 102 responsive to clock signal 108 for receipt by up/down counter 101. A complete roundtrip cycle, as generally indicated with a loop 140, of a token, namely a forward token 111 and a return token 112, may take a number of register stages in each of pipelines 136 and 137, as well as a one or two clock cycle delay for FWFT FIFO 125 and one clock cycle to update a count value in up/down counter 101.

In this example, each return token 112 may be provided from return token register 102 to an increment port of up/down counter 101. Each return token 112, namely a logic 1 output from return token register 102 to such increment port, may cause up/down counter 101 to increment a current count by one, up to a maximum value.

Continuing the above example, up/down counter 101 may be initialized or reset to 33. As forward tokens 111 are issued, up/down counter 101 counts down from 33 by one for each of such forward tokens. This count down cannot fall below a count of zero, as forward tokens are not issued for a count of zero in up/down counter 101. As return tokens 112 are returned to up/down counter 101, a count of up/down counter 101 is incremented up by one for each of such return tokens.

Up/down counter 101 may be configured to adjust a count thereof responsive to each return token 112 either down or up opposite an adjustment of such count responsive to receipt of each forward token 111 by up/down counter 101. In this example, return tokens 112 increment and forward tokens 111 decrement a count of up/down counter 101; however, in another example, return tokens 112 may decrement and forward tokens 111 may increment a count of up/down counter 101. In either example, up/down counter 101 may be used to control data flow in data channel 100 by keeping track of a number of data input instances in data channel 100.

For return token signal 117 in a logic low state, no return token or tokens 112 are input to return token register 112 of return token pipeline 127. Accordingly, if return token signal 117 is in a low state for an extended period of time, up/down counter 101 may countdown to zero to stop issuing any further forward tokens 111, and so input circuit 110 of data channel 100 may not be available to receive any further input data, as indicated by deassertion of ready input signal 106 by up/down counter 101 having reached a count of zero. Such a condition may be cleared by a reset or by up/down counter 101 counting up responsive to receiving return tokens 112 after return token signal 117 returns to a logic high state.

Return token signal 117 may be a logic 0 responsive to a downstream circuit (not shown) not being available to receive output data via data output signal 131, which may be indicated by deassertion of ready input signal 128, namely in this example for ready input signal 128 being at a logic 0 state. However, for purposes of clarity by way of example and not limitation, it is assumed that ready input signal 128 is logic 1.

Coupled between input circuit 110 and output circuit 120 may be one or more interim circuits 130 for pipelined operation Each of interim circuits 130 may include a return token register 132 coupled between return token register 122 and return token register 102 in return token pipeline 137 for return direction 138. Each of interim circuits 130 may include a forward token register 133 coupled between forward token register 103 and forward token register 123 in forward token pipeline 136 for forward direction 119. Each of interim circuits 130 may include a data input register 134 coupled between data input register 104 and data input register 124 in data pipeline 135 for data flow direction 118.

Effectively, pipelines 135 and 136 do not include combinatorial logic, which allows for fewer circuit resources and/or higher throughput to be obtained. A last register stage of pipelines 135 and 136 may respectively output into a multiple-entry FIFO, namely FWFT FIFO 125, in a last or output stage provided by output circuit 120 of a data channel 100. This is to be contrasted with a conventional data channel, with flip-flops and multiplexers, commonly known as "skid buffers," at every pipeline register stage. Conceptually, pipelines 135 and 136 consolidate skid buffers, equivalent to 1-entry FIFOs, into a multiple-entry FIFO, namely FWFT FIFO 125.

While each of pipelines 135 and 136 may have a same number of register stages, return token pipeline 137 may have the same or fewer register stages the forward token pipeline 136 for example. This is because return tokens 112 do not have to travel lock-step in a return direction 138 corresponding to travel of forward tokens 111 in a forward direction 119. In other words, a 1-bit forward token 111 signal flows in step with input data 113, but a 1-bit return token 112 signal flows opposite such input data 113, and so there is no exact timing relationship between these two 1-bit signals. This absence of an exact timing relationship may allow for a more efficient implementation by having fewer register stages and/or a higher clock frequency associated with passing such return token 112 from output circuit 120 back to input circuit 110.

With the above-description borne in mind, a data channel 100 with a ready/valid handshake protocol has been described. Data channel 100 by configuring input circuit 110 and output circuit 120 as described allows one or more interim circuits 130 to each include a register stage of only a data input register 134, a forward token register 133, and a return token register 132. In other words, interim circuits 130 may be readily absorbed into a data channel interconnect without having to include a clock enable or clock activation signal or any logic. This facilitates having: large data width interfaces, such as for example for AXI interfaces; longer interface distances between upstream and downstream circuits with respect to data channel 100; and a pipelined interconnect between upstream and downstream circuits using a data channel 100. Such upstream and downstream circuits may be fixed hard-block circuit locations, and so an ability to interconnect same over a long distance with piped operation may have significant performance advantages.

Figure 2:
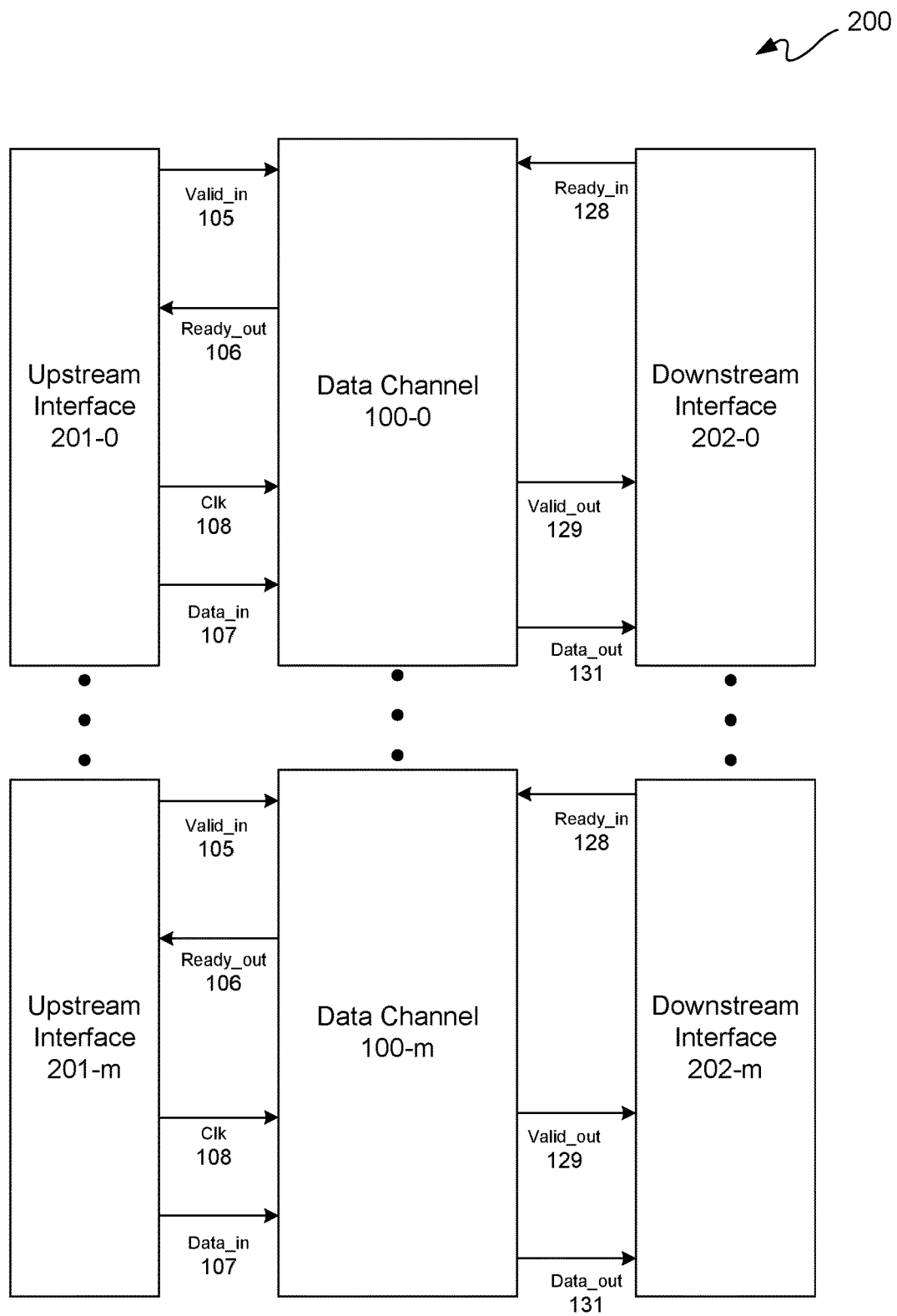
FIG. 2 is a block diagram depicting an exemplary multiple channel system.

FIG. 2 is a block diagram depicting an exemplary multiple channel system 200. Multiple channel system 200 in this example is for a ready/valid interface; however, other types of interfaces using ready/valid handshaking may be used. Multiple channel system 200 may be in an integrated circuit, such as an FPGA, ASIC, or other integrated circuit, or a 2.5D integrated circuit, such as for going from one IC chip to another IC chip including through an interposer or other circuit platform.

In this example, there are data channels 100-0 through 100-*m* form a positive integer greater than one. Data channels 100-0 through 100-*m* are respectively coupled between upstream interfaces 201-0 through 201-*m* and downstream interfaces 202-0 through 202-*m*. Though all data flow is from left to right across the figure in this example, in another example data flow may be the other direction or a combination of both directions.

Along those lines, interfaces 201 and 202 may be respective AXI interfaces. An AXI interface may include five independent channels, namely write address, write data, write response, read address, read data (respectively, AW, W, B, AR, R channels). Data for AR, AW, W channels flows from primary circuits or master devices to secondary circuits or client devices. Data for B and R channels flows from secondary circuits or client devices to primary circuits or master devices.

Each of data channels 100-0 through 100-*m* channels uses valid/ready handshaking. For such handshaking, if both ready and valid signals are asserted for a clock cycle on an input side of a data channel 100, then data is transferred for input to such a data channel. Likewise, for such handshaking, if both ready and valid signals are asserted for a clock cycle on an output side of a data channel 100, then data is transferred for output from such a data channel.

However, with reference to one or more interim circuits 130-*n* of a data channel 100-*m*, there is no ready/valid signaling used internally in such interim circuits. Each interim circuit 130-*n* is decoupled from ready/valid handshaking, which simplifies internal pipeline register stages to a bank of registers or flip-flops. Rather than a valid signal, a token may be used for pipelined operation, and no ready signal is used for such pipelined operation. Such one or more interim circuits 130-*n* are respectively coupled between input circuit 110 and output circuit 120 for pipelined operation, which pipelined operation is decoupled from valid input signal 105 and ready output signal 106 handshaking by passage of forward token 111 with data 113 and decoupled from valid output signal 129 and ready input signal 128 handshaking by passage of return token 112.

Additionally, full bandwidth may depend upon round trip cycles of a token. For example, there may be n+2 register stages of forward token pipeline 136, an input clock cycle for FWFT FIFO 125, a clock cycle to update up/down counter 101, and n+2 or less register stages of return token pipeline 137. Recall, the integer n refers to a number of interim circuits 130, where n can equal 0, and so the value of 2 in n+2 is to reflect a pipeline register stage of each of input circuit 110 and output circuit 120.

Assuming there are n+2 stages in return token pipeline 137, then there may be a total of 2n+6 register stages for a complete round trip cycle 140 of a token. For an FPGA example, a shallowest FWFT FIFO may support 33 entries, and so even holding a complete round trip cycle 140 of a token to less than the number of entries in FWFT FIFO 125, 2 to 15 register stages for each of pipelines 135, 136 and 137 may be supported.

Figure 3:
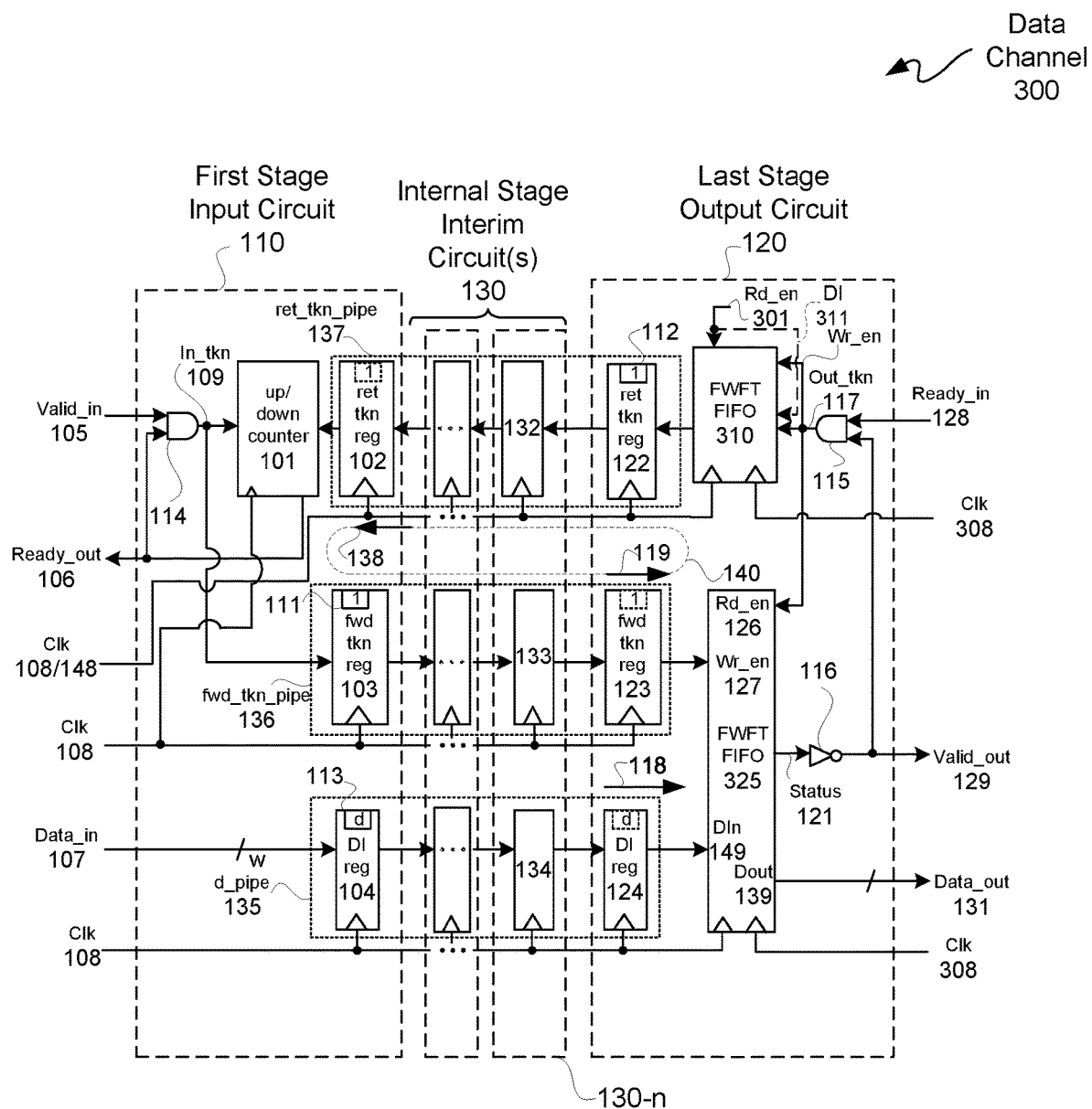
FIG. 3 is a block-circuit diagram depicting another exemplary data channel.

FIG. 3 is a block-circuit diagram depicting another exemplary data channel 300. Data channel 300 may be one of many data channels 300 in an integrated circuit, such as an FPGA, ASIC or other integrated circuit. Data channel 300 has is similar to data channel 100 of FIG. 1, and so generally only differences between data channels 100 and 300 are described below for purposes of clarity and not limitation.

In this example, FWFT FIFO 125 is replaced by FWFT FIFO 325, which is the same as FWFT FIFO 125 except that FWFT FIFO 325 has separate write clock and read clock ports. Additionally, another FWFT FIFO 310 is added. FWFT FIFO 310 may be added to transfer a return token 112 from one clock domain 308 to another clock domain 108. Furthermore, in another example, a clock signal 148, which is faster than clock signal 108, may be used to clock, such as previously described.

FWFT FIFO 310 may be only a few entries deep. Depth of FWFT FIFO 310 depends at least in part on the ratio of frequencies of clock signals 108 and 308, or 148 and 308, as may vary from implementation to implementation.

For purposes of clarity by way of example and not limitation, it is assumed that clock signal 108 is used in this example. FWFT FIFO 310 may be a one-bit asynchronous FWFT FIFO for sending a return token 112, namely sending a read acknowledgement, via return token pipeline 137 to up/down counter 101.

Even though dual clocked FWFT FIFOs 310 and 325 are depicted, in another example other clock crossing domain circuitry may be used. Some examples of other configurations include: single clocked FWFT FIFOs 310 and 325; dual clocked FWFT FIFOs 310 and 325; a dual clocked FWFT FIFO 325 and other clock domain crossing circuitry; or a single clocked FWFT FIFO 325 and other clock domain crossing circuitry. Along those lines, a FWFT FIFO 310 need not be used, as such buffer is for storing a single bit, many equivalent circuits for storing or latching a single bit at a time may be used.

Even though FWFT FIFO 310 is depicted as being directly coupled to a far right or input side of a first return token register 122 of return token pipeline 137 for this example, in another example FWFT FIFO 310 may be coupled inside return token pipeline 137, such as anywhere between a first return token register 122 and a last return token register 102 of return token pipeline 137. For example, FWFT FIFO 310 may be directly coupled between any two neighboring interim return token registers 132. Furthermore, in yet another example, FWFT FIFO 310 may be directly coupled to the far left or output side of a last return token register 102 of return token pipeline 137 for providing an input to up/down counter 101.

A write or input side of FWFT FIFO 325 is clocked with transmit clock signal 108 provided to a write clock port of FWFT FIFO 325. A read or output side of FWFT FIFO 310 is clocked with a transmit clock signal 108 provided to a read clock port of FWFT FIFO 310.

Similarly, a write or input side of FWFT FIFO 310 is clocked with a receive clock signal 308 provided to a write clock port of FWFT FIFO 310. A read or output side of FWFT FIFO 325 is clocked with receive clock signal 308 provided to a read clock port of FWFT FIFO 325. Clock signals 108 and 308 may be the same or different with respect to either or both frequency or phase.

For this example, FWFT FIFO 310 may be configured to receive a return token 112 of return token signal 117 to a write activation port and a data input port respectively of FWFT FIFO 310. In another example, a constant logic 1 input, such as fixed signal 301, may be applied to a data input port, as generally indicated with dashed line 311, of FWFT FIFO 310 instead of return token signal 117. However, for purposes of clarity, application of return token signal 117 to data input and write activation ports of FWFT FIFO 310 is described. A data 1 input responsive to assertion of return token signal 117 provided to a write activation port and a data input port of FWFT FIFO 310 causes such a logic 1 to be loaded or written to FWFT FIFO 310.

FWFT FIFO 310 may be configured to receive a fixed signal 301, which in this example is tied to a logic high or 1, to a read activation port of FWFT FIFO 310 to read out on each clock cycle. FWFT FIFO 310 may be configured to provide a return token 112 to return token register 122 received via return token signal 117. Such return token 112 may be clocked into FWFT FIFO 310 responsive to clock signal 308 and clocked out of FWFT FIFO 310 responsive to clock signal 108.

As a return token 112 activates FWFT FIFO 310 to write in such return token 112 responsive to a leading edge for example of clock signal 308, and as a read activation port of FWFT FIFO 310 is held active, each return token 112 written into FWFT FIFO 310 is immediately read out for example on a leading edge of clock signal 108 for input to return token register 122. It should be understood that in this example reading an empty FWFT FIFO 310 yields a logic low or 0.

When a return token 112 is not asserted on return token signal 117, a write activation port of FWFT FIFO 310 is not strobed for a write. In other words, unless there is a return token 112 to write into FWFT FIFO 310, there is nothing to write into FWFT FIFO 310.

FWFT FIFO 325 is the same as FWFT FIFO 125, except output data on data output bus 139 is read out of FWFT FIFO 325 responsive to clock signal 308. Addition of FWFT FIFO 310 and replacement with FWFT FIFO 325 allows output circuit 120 to cross clock domains, namely a clock domain of clock signal 108 and a clock domain of clock signal 308 in this example. Moreover, use of separate clock signals 108 and 308 may be for performing asynchronous writes with respect to reads by FWFT FIFO 325.

Figure 4:
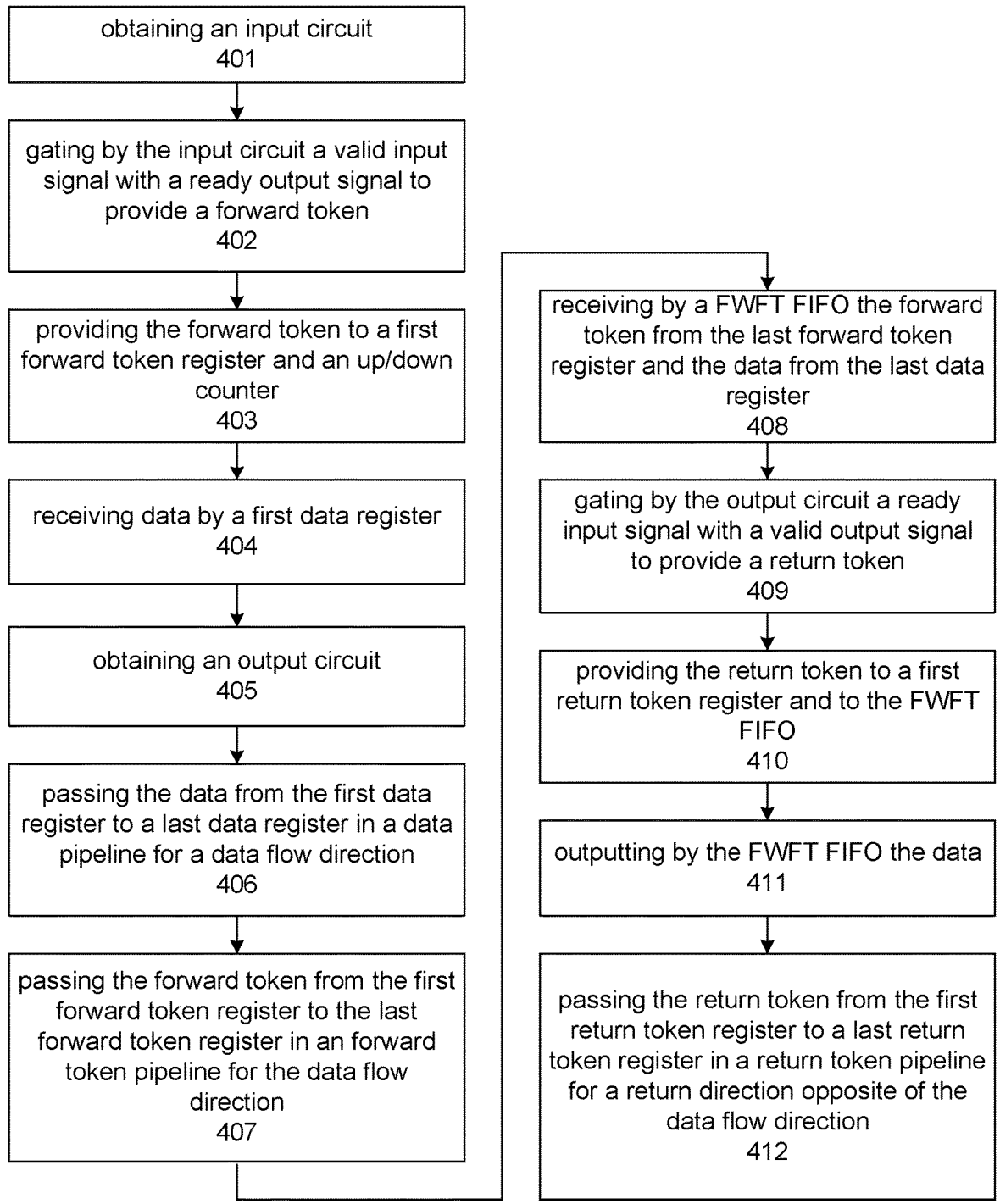
FIG. 4 is a flow diagram depicting an exemplary controlled pipelining flow.

FIG. 4 is a flow diagram depicting an exemplary controlled pipelining flow 400. Controlled pipelining flow 400 may be for a data channel 100 or 300 from an input circuit 110 to an output circuit 120 thereof using ready/valid handshaking. However, for purposes of clarity by way of example and not limitation, controlled pipelining flow 400 of FIG. 4 is described for data channel 100 with additional reference to FIGS. 1 and 3.

At operation 401, an input circuit 110 with an up/down counter 101, a return token register 102, a data input register 104, and a forward token register 103 is obtained. At operation 402, input circuit 110 gates a valid input signal 105 with a ready output signal 106 to provide a forward token 111 via a forward token signal 109.

At operation 403, a forward token signal 109 is provided to forward token register 103 and to up/down counter 101. Forward token register 103 may be a first register in a forward token pipeline 136. At operation 404, data input register 104 receives input data via a data input signal 107 in association with valid input signal 105 and forward token signal 109. At operation 405, an output circuit 120 with a first word fall through first-in, first-out buffer ("FWFT FIFO") 125, a return token register 122, a data input register 124, and a forward token register 123 is obtained.

At operation 406, input data or data 113 is passed from data input register 104 to data input register 124 in a data pipeline 135 for a data flow direction 118. Data input register 104 may be a first register and data input register 124 may be a last register in data pipeline 135.

At operation 407, a forward token 111 is passed from forward token register 103 to forward token register 123 in a forward token pipeline 136 for data flow direction 118.

Forward token register 103 may be a first register and forward token register 123 may be a last register in a forward token pipeline.

Each passing of forward token 111 and input data 113 associated therewith in data flow direction 118 may be pipelined to FWFT FIFO 125 responsive to a clock signal 108 respectively via forward token pipeline 136 and data pipeline 135.

At operation 408, FWFT FIFO 125 receives forward token 111 from forward token register 123 and input data 113 from data input register 124. Again, receipt by FWFT FIFO 125 of a forward token 111 from a forward token register 123 may be to a write activation port 127 of FWFT FIFO 125, and receipt of corresponding input data 113 from data input register 124 may be to a data input port 149 of FWFT FIFO 125.

At operation 409, output circuit 120 gates a ready input signal 128 with a valid output signal 129 to provide a return token signal 117, as previously described. At operation 410, return token signal 117 is provided to return token register 122 and to FWFT FIFO 125, as previously described. Return token register 122 may be a first register in a return token pipeline 137.

At operation 411, FWFT FIFO 125 outputs output data 113 on an output data signal 131 in association with valid output signal 129. At operation 412, a return token 112 of return token signal 117 may be passed from return token register 122 to return token register 102 in a return token pipeline 137 for a return direction 138 opposite of data flow direction 119. Return token register 102 may be a last register in a return token pipeline 137.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device or provided to an internal configuration port or generated internally within the FPGA by a processor and/or dedicated circuit block. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 5:
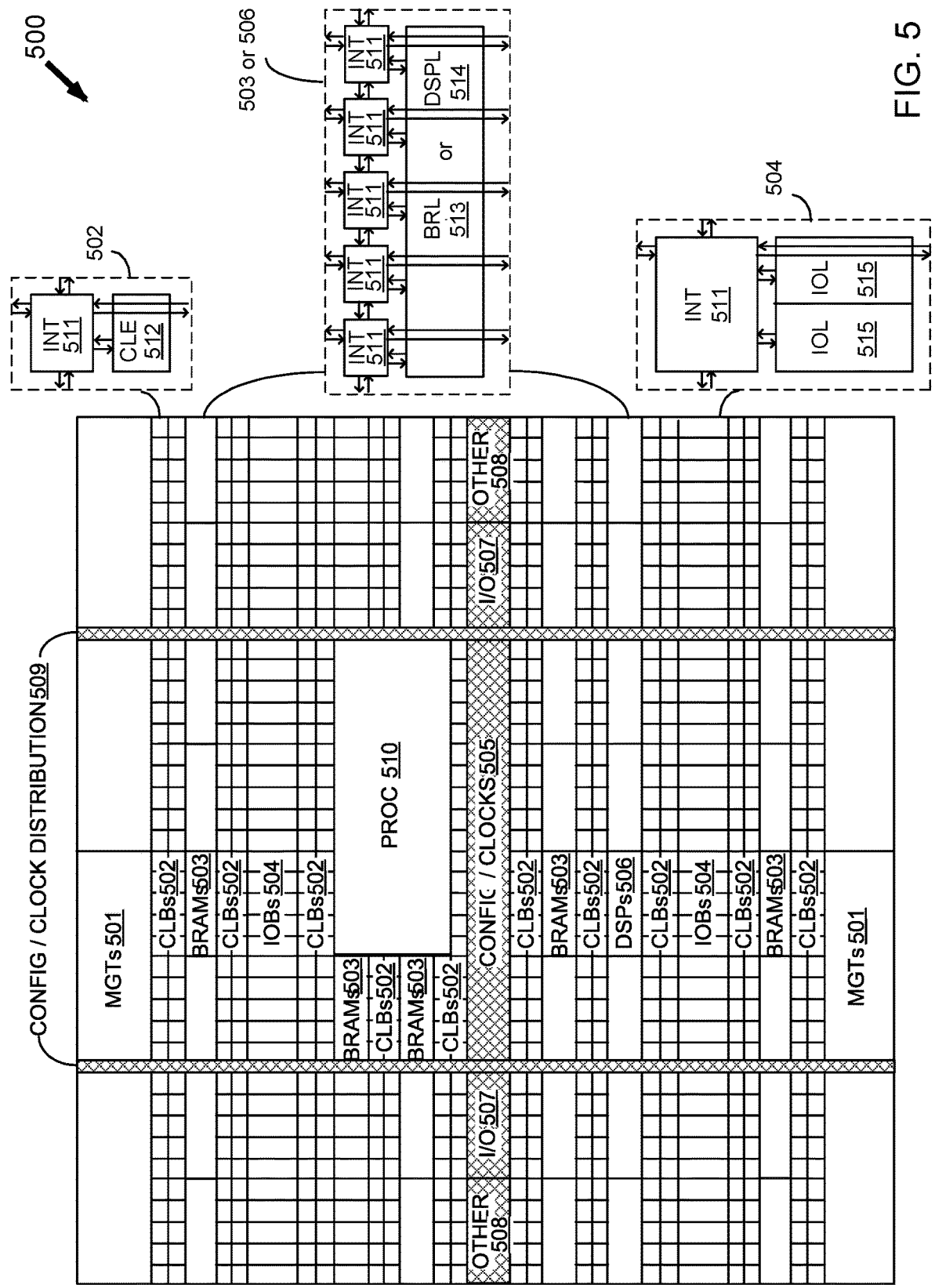
FIG. 5 is a simplified block diagram depicting an exemplary columnar Field Programmable Gate Array ("FPGA") architecture.

As noted above, advanced FPGAs can include several different types of programmable logic blocks in the array. For example, FIG. 5 illustrates an FPGA architecture 500 that includes a large number of different programmable tiles including multi-gigabit transceivers ("MGTs") 501, configurable logic blocks ("CLBs") 502, random access memory blocks ("BRAMs") 503, input/output blocks ("IOBs") 504, configuration and clocking logic ("CONFIG/CLOCKS") 505, digital signal processing blocks ("DSPs") 506, specialized input/output blocks ("I/O") 507 (e.g., configuration ports and clock ports), and other programmable logic 508 such as digital clock managers, analog-to-digital converters, system monitoring logic, and so forth. Some FPGAs also include dedicated processor blocks ("PROC") 510.

In some FPGAs, each programmable tile includes a programmable interconnect element ("INT") 511 having standardized connections to and from a corresponding interconnect element in each adjacent tile. Therefore, the programmable interconnect elements taken together implement the programmable interconnect structure for the illustrated FPGA. The programmable interconnect element 511 also includes the connections to and from the programmable logic element within the same tile, as shown by the examples included at the top of FIG. 5.

For example, a CLB 502 can include a configurable logic element ("CLE") 512 that can be programmed to implement user logic plus a single programmable interconnect element ("INT") 511. A BRAM 503 can include a BRAM logic element ("BRL") 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element ("DSPL") 514 in addition to an appropriate number of programmable interconnect elements. An IOB 504 can include, for example, two instances of an input/output logic element ("IOL") 515 in addition to one instance of the programmable interconnect element 511. As will be clear to those of skill in the art, the actual I/O pads connected, for example, to the I/O logic element 515 typically are not confined to the area of the input/output logic element 515.

In the pictured embodiment, a horizontal area near the center of the die (shown in FIG. 5) is used for configuration, clock, and other control logic. Vertical columns 509 extending from this horizontal area or column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, processor block 510 spans several columns of CLBs and BRAMs.

Note that FIG. 5 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 5 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A data channel, comprising:
an input circuit having:
a first gate configured to gate a valid input signal with a ready output signal to provide a forward token;
a first forward token register configured to receive the forward token;
an up/down counter configured to receive the forward token; and
a first data register configured to receive data;
an output circuit having:
a second gate configured to gate a ready input signal with a valid output signal to provide a return token;
a first return token register configured to receive the return token;
a first word fall through first-in first-out buffer circuit ("FWFT FIFO") configured to receive the return token;
a second forward token register configured to provide the forward token to the FWFT FIFO;
a second data register configured to provide the data to the FWFT FIFO; and
the FWFT FIFO configured to output the data; and
the input circuit further having a second return token register configured to receive the return token from the first return token register for the up/down counter.

2. The data channel according to claim 1, wherein:
the first data register and the second data register form a data pipeline to pass the data in a data flow direction from the first data register to the second data register;
the first forward token register and the second forward token register form a forward token pipeline to pass the forward token in the data flow direction; and
the first return token register and the second return token register form a return token pipeline to pass the return token in a return direction opposite the data flow direction.

3. The data channel according to claim 2, wherein:
the output circuit is configured to provide the return token to a read port of the FWFT FIFO; and
the FWFT FIFO is configured to receive the forward token to a write port of the FWFT FIFO and to receive the data to a data input port of the FWFT FIFO.

4. The data channel according to claim 3, wherein:
the forward token pipeline and the data pipeline are clocked responsive to a first clock signal; and
the return token pipeline is clocked responsive to a second clock signal.

5. The data channel according to claim 4, wherein the up/down counter is configured to:
adjust a count responsive to the forward token and the return token; and
assert the ready output signal responsive to the count being greater than a threshold value.

6. The data channel according to claim 5, wherein:
the forward token pipeline and the data pipeline each have a same number of register stages; and
the return token pipeline has at least one fewer register stage than the forward token pipeline or is clocked at a higher frequency than the forward token pipeline.

7. The data channel according to claim 5, wherein the up/down counter is configured to adjust the count responsive to the return token opposite adjustment responsive to the forward token.

8. The data channel according to claim 5, wherein:
the first gate is a first AND gate coupled to receive the valid input signal and the ready output signal to provide the forward token;
the second gate is a second AND gate coupled to receive the valid output signal and the ready input signal to provide the return token; and
the output circuit includes an inverter coupled to receive a status signal from the FWFT FIFO to provide the valid output signal.

9. The data channel according to claim 3, wherein the FWFT FIFO is a first FWFT FIFO, and wherein the output circuit comprises:
a second FWFT FIFO configured to receive and provide the return token to the first return token register.

10. The data channel according to claim 9, wherein:
the forward token pipeline, the data pipeline, and a write side of the first FWFT FIFO are all clocked with a first clock signal; and
a read side of the first FWFT FIFO and a write side of the second FWFT FIFO are both clocked with a second clock signal different from the first clock signal.

11. The data channel according to claim 10, wherein the return token pipeline is configured to pass the return token responsive to a third clock signal.

12. The data channel according to claim 11, wherein the up/down counter is configured to:
adjust a count responsive to the forward token and the return token;

assert the ready output signal responsive to the count being greater than a threshold value; and adjust the count responsive to the return token opposite adjustment of the count by the forward token.

13. The data channel according to claim 12, wherein:
the first gate is a first AND gate;
the second gate is a second AND gate; and
the output circuit includes an inverter coupled to receive a status signal from the first FWFT FIFO to provide the valid output signal.

14. The data channel according to claim 10, further comprising one or more interim circuits respectively coupled between the input circuit and the output circuit for pipelined operation, wherein each of the interim circuits comprises:
a third return token register coupled between the first return token register and the second return token register in the return token pipeline;
a third forward token register coupled between the first forward token register and the second forward token register in the forward token pipeline; and
a third data register coupled between the first data register and the second data register in the data pipeline.

15. The data channel according to claim 2, further comprising one or more interim circuits respectively coupled between the input circuit and the output circuit for pipelined operation, wherein each of the interim circuits comprises:
a third return token register coupled between the first return token register and the second return token register in the return token pipeline;
a third forward token register coupled between the first forward token register and the second forward token register in the forward token pipeline; and
a third data register coupled between the first data register and the second data register in the data pipeline.

16. The data channel according to claim 15, wherein the one or more interim circuits are decoupled from the valid input signal and the ready output signal handshake by passage of the forward token with the data and decoupled from the valid output signal and the ready input signal handshake by passage of the return token.

17. A method for a data channel, comprising:
controlled pipelining of information between an input circuit and an output circuit, the controlled pipelining comprising:
gating by the input circuit a valid input signal with a ready output signal to provide a forward token to a first forward token register of a forward token pipeline and to the up/down counter;
receiving a data by a first data register of a data pipeline;
passing the data from the first data register to a second data register in the data pipeline for a data flow direction;
passing the forward token from the first forward token register to a second forward token register in the forward token pipeline for the data flow direction;
receiving the forward token from the second forward token register and the data from the second data register by a first word fall through first-in first-out buffer circuit ("FWFT FIFO") of the output circuit;
gating by the output circuit a ready input signal with a valid output signal to provide a return token to a first return token register of a return token pipeline;
outputting the data from the FWFT FIFO; and
passing the return token from the first return token register to a second return token register of the return token pipeline.

18. The method according to claim 17, further comprising providing the return token to the FWFT FIFO; and
wherein the passing of the return token from the first return token register to the second return token register in the return token pipeline is for a return direction opposite of the data flow direction.

19. The method according to claim 18, wherein:
the providing of the return token to the FWFT FIFO is to a read port of the FWFT FIFO; and
the receiving by the FWFT FIFO of the forward token from the second forward token register is to a write port of the FWFT FIFO; and
the receiving by the FWFT FIFO of the data from the second data register is to a data input port of the FWFT FIFO.

20. The method according to claim 19, wherein:
each of the passing of the forward token and the data associated therewith in the data flow direction is pipelined to the FWFT FIFO respectively via the forward token pipeline and the data pipeline responsive to a first clock signal; and
the passing of the return token in the return direction via the return token pipeline is responsive to a second clock signal different in frequency from the first clock signal and is for output from the return token pipeline for receipt by the up/down counter.

* * * * *